United States Patent
Yoshimura et al.

(10) Patent No.: US 7,517,598 B2
(45) Date of Patent: *Apr. 14, 2009

(54) MAGNETIC RECORDING MEDIUM UTILIZING SPECIFIED NON-MAGNETIC PARTICLES IN THE MAGNETIC LAYER

(75) Inventors: Ken Yoshimura, Ibaraki (JP); Tetsutaro Inoue, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 129 days.

This patent is subject to a terminal disclaimer.

(21) Appl. No.: 11/621,854

(22) Filed: Jan. 10, 2007

(65) Prior Publication Data

US 2007/0111040 A1  May 17, 2007

Related U.S. Application Data

(62) Division of application No. 10/983,677, filed on Nov. 9, 2004, now Pat. No. 7,175,927.

(30) Foreign Application Priority Data

Nov. 10, 2003 (JP) .......................... P2003-380236

(51) Int. Cl.
*G11B 5/708* (2006.01)
(52) U.S. Cl. .................. 428/844.1; 428/844; 428/844.3
(58) Field of Classification Search ........................ None
See application file for complete search history.

(56) References Cited

U.S. PATENT DOCUMENTS

| 4,238,341 | A | 12/1980 | Kato et al. |
| 4,590,127 | A | 5/1986 | Hashimoto et al. |
| 6,251,509 | B1 | 6/2001 | Kawamata et al. |
| 6,372,302 | B1 | 4/2002 | Kurose et al. |
| 6,610,426 | B2 | 8/2003 | Hashimoto et al. |
| 7,175,927 | B2 * | 2/2007 | Yoshimura et al. ....... 428/844.1 |
| 2004/0089564 | A1 | 5/2004 | Kuse et al. |
| 2005/0277001 | A1 | 12/2005 | Inoue et al. |
| 2006/0003191 | A1 | 1/2006 | Kuse et al. |

FOREIGN PATENT DOCUMENTS

| JP | 11-126325 | A | 5/1999 |
| JP | 11-238225 | A | 8/1999 |
| JP | 2000-40217 | A | 2/2000 |
| JP | 2000-40218 | A | 2/2000 |
| JP | 3046580 | B2 | 3/2000 |
| JP | 2001-155324 | A | 6/2001 |
| JP | 3240672 | B2 | 10/2001 |

* cited by examiner

*Primary Examiner*—Kevin M Bernatz
(74) *Attorney, Agent, or Firm*—Birch, Stewart, Kolasch & Birch, LLP

(57) ABSTRACT

A magnetic recording medium having a non-magnetic support and a magnetic layer formed thereon, wherein the magnetic layer comprises a ferromagnetic powder, a binder and a non-magnetic inorganic powder, and wherein at least 95% of the non-magnetic powder particles contained in the magnetic layer have a particle size of 0.05 to 0.013 μm, provide that the non-magnetic powder particles are those found in a field of view of 1.8 μm×2.4 μm when the surface of the magnetic layer is observed with a scanning electron microscope at a magnification of 50,000 times.

4 Claims, No Drawings

MAGNETIC RECORDING MEDIUM UTILIZING SPECIFIED NON-MAGNETIC PARTICLES IN THE MAGNETIC LAYER

This application is a Divisional of application Ser. No. 10/983,677, filed on Nov. 9, 2004, which is now U.S. Pat. No. 7,175,927, the entire contents of which are hereby incorporated by reference and for which priority is claimed under 35 U.S.C. § 120.

FIELD OF THE INVENTION

The present invention relates to a coating type magnetic recording medium comprising a non-magnetic support, and a nonmagnetic coating layer and a magnetic coating layer which are formed on the support. In particular, the present invention relates to a coating type magnetic layer having a high recording capacity, a high access speed and a high transfer speed.

BACKGROUND ART

Magnetic tapes have found various applications in audio tapes, videotapes, magnetic tapes for data-backup, etc. In particular, in the field of magnetic tapes for data-backup (or backup tapes), tapes having memory capacities of several ten GB or more per reel are commercialized in association with the increased capacities of hard discs for back-up. Therefore, it is indispensable to increase the capacity of this type of tape for data-backup, so as to meet the demand for a hard disc having a far larger memory capacity. It is also necessary to increase the feeding speed of a tape and a relative speed between the tape and heads in order to quicken an access speed and a transfer speed.

To increase the recording capacity of a magnetic recording medium, it is tried to shorten a recording wavelength. With the shortening of the recording wavelength, the particle size of magnetic powder used is decreased. As a result, the durability of a magnetic layer decreases so that it becomes difficult to maintain sufficient reliability against damages caused by sliding of the medium on a head.

When the thickness of a magnetic coating layer is decreased and a track width is narrowed in response to the increase of a recording capacity, leakage magnetic fluxes from the magnetic recording medium becomes smaller. Therefore, MR heads are increasingly used as reproducing heads, since they comprise magnetoresistance elements capable of obtaining high outputs even if magnetic fluxes are very small. The MR heads are made of soft materials and in the form of a very thin layer so that they are less abrasion resistant, while conventional magnetic induction type heads are made of relatively hard materials.

Examples of the magnetic recording media which can correspond to MR heads are disclosed in JP-A-11-238225, JP-A-2000-40217 and JP-A-2000-40218. In these magnetic recording media, skewness of outputs from the MR heads is prevented by controlling the magnetic fluxes from the magnetic recording medium (a product of a residual magnetic flux density and the thickness of the a magnetic layer) to a specific value or less, or the thermal asperity of the MR heads is reduced by lessening the dents on the surface of the magnetic layers to a specific value or less.

To improve the durability of the magnetic layer, inorganic powder is usually added to the magnetic layer. In particular, inorganic powder having high Mohs hardness such as alumina, etc. is added to the magnetic layer. The addition of alumina powder is disclosed in JP-A-11-126325, JP 3240672B, JP-A-2001-155324 and JP 3046580B.

However, when the inorganic powder having high Mohs hardness such as alumina is added to the magnetic powder, the head is heavily abraded with the inorganic powder although the durability of the magnetic layer increases. In JP-A-11-126325, JP 3240672B, JP-A-2001-155324 and JP 3046580B, the relationship of the pH and particle size of alumina with an amount of a lubricant, the relationship of the particle size of alumina with the surface roughness of the magnetic layer and the like are studied to achieve the low abrasion of the head and the increased durability of the magnetic layer at the same time. However, the results are not satisfactory.

SUMMARY OF THE INVENTION

An object of the present invention is to provide a magnetic recording medium which corresponds to the increase of a recording capacity and achieves the low abrasion of a head and the increased durability of a magnetic layer at the same time, and has good balance between these properties.

Accordingly, the present invention provides a magnetic recording medium comprising a non-magnetic support and a magnetic layer formed on the non-magnetic support, wherein the magnetic layer forms the outermost layer of the magnetic recording medium and comprises a ferromagnetic powder, a binder and a non-magnetic inorganic powder, and wherein at least 95% of the non-magnetic powder particles including primary and secondary particles, which are contained in the magnetic layer, have a particle size of 0.05 to 0.013 μm, provide that the non-magnetic powder particles are those found in a field of view of 1.8 μm×2.4 μm when the surface of the magnetic layer is observed with a scanning electron microscope at a magnification of 50,000 times (SEM observation).

In one preferred embodiment of the present invention, at least 95% of the non-magnetic powder particles, which are found in the same field of view as above according to the SEM observation, have an acicular ratio (a ratio of a major axis length to a minor axis length) of 1.5 or less, more preferably from 1.1 to 1.5.

In another preferred embodiment of the present invention, the non-magnetic powder contained in the magnetic layer is single crystal alumina.

In a further preferred embodiment of the present invention, the magnetic recording medium further comprises a non-magnetic layer comprising a non-magnetic inorganic powder, a binder and a fatty acid between the non-magnetic support and the magnetic layer.

Herein, the particle size of a non-magnetic inorganic powder is an average value of a major axis length and a minor axis length, which are measured as follows:

Major Axis Length:

The surface of a magnetic recording layer (magnetic layer) of a magnetic recording medium is observed and photographed with a scanning electron microscope (SEM) at a magnification of 50,000 times, and then the photograph is image-processed to obtain the two-dimensional image of the shape of each particle. Then, the longest size of each particle among the sizes in all directions is selected as a major axis length.

Minor Axis Length:

The two-dimensional image of the shape of each particle is obtained in the same manner as the measurement of a major axis length. Then, the shortest size of the particle among the line segments which pass the center of the major axis is selected as a minor axis length.

DETAILED DESCRIPTION OF THE INVENTION

In the magnetic recording medium of the present invention, at least 95% of the non-magnetic powder particles including primary and secondary particles, which are contained in the magnetic layer, have a particle size of 0.05 to 0.013 µm. The magnetic powder particles, the sizes of which are measured are those found in a field of view of 1.8 µm×2.4 µm when the surface of the magnetic layer is observed with a scanning electron microscope at a magnification of 50,000 times (SEM observation). When the percentage of the magnetic powder particles having the above particle size is less than 95%, it may be difficult to achieve the good durability and low abrasion property at the same time. If the amount of particles having a particle size of less than 0.05 µm exceeds 5%, the durability of the magnetic recording medium quickly decreases. If the amount of particle having a particle size of larger than 0.13 µm exceeds 5%, the degree of abrasion of a head used for writing and reading exceeds a tolerance level so that the head cannot be used for a large number of times.

When 95% or more of the non-magnetic powder particles have an acicular ratio of 1.5 or less, the durability and the low abrasion properties can be further improved.

The magnetic recording medium according to the present invention is usually used for digital recording, and has a magnetic layer on at least one surface of a non-magnetic support. In the case of a magnetic tape which should have a high recording density, a non-magnetic layer is preferably formed between the non-magnetic support and the magnetic layer. Hereinafter the magnetic layer and the non-magnetic layer may sometimes referred to as an upper magnetic layer and a lower non-magnetic layer, respectively from the viewpoint of the spatial relationship of these two layers.

Furthermore, when a magnetic tape should have a high running reliability, a backcoat layer can be formed on the surface of the support opposite to the surface carrying the upper magnetic layer and the optional lower non-magnetic layer.

DETAILED DESCRIPTION OF THE INVENTION

Hereinafter, a non-magnetic support, a lower non-magnetic layer, an upper magnetic layer and a backcoat layer will be explained in detail.

Non-Magnetic Support:

A non-magnetic support preferably has a Young's modulus of at least 5.9 GPa (600 kg/mm$^2$), more preferably at least 9.9 GPa (1000 kg/mm$^2$) in the machine direction, and a Young's modulus of at least 3.9 GPa (400 kg/mm$^2$), more preferably at least 7.9 GPa (800 kg/mm$^2$) in a transverse direction.

When the Young's modulus in the machine direction is less than 5.9 GPa, the running of the magnetic tape becomes unstable. When the Young's modulus in the transverse direction is less than 3.9 GPa, the edge of the tape may easily be damaged.

As a non-magnetic support which satisfies the above properties, a polyethylene terephthalate film, a polyethylene naphthalate film, a biaxially drawn aromatic polyamide or polyimide film or the like is used.

The thickness of the non-magnetic support varies with the applications of the magnetic recording medium, and is usually from 2 to 7 µm, more preferably from 2.5 to 4.5 µm. When the thickness of the non-magnetic support is less than 2 µm, it is difficult to product a polymer film having such a small thickness and also the strength of the magnetic tape decreases. When the thickness of the non-magnetic support exceeds 7 µm, the total thickness of the magnetic tape increases so that the recording capacity per reel decreases.

The non-magnetic support preferably has a center line average surface roughness Ra of 2.5 to 20 nm. When Ra is 20 nm or less, the surface roughness on the surfaces of the lower non-magnetic layer and the upper magnetic layer is minimized even when the thickness of the lower non-magnetic layer is small. It is difficult to produce a polymer film having Ra of less than 2.5 nm.

Non-Magnetic Layer:

Preferably, the lower non-magnetic layer contains a non-magnetic inorganic powder such as metal oxides, alkaline earth metal salts, etc. to increase its strength. Among the inorganic powder, iron oxide is more preferable. In particular, iron oxide having a particle size of 50 to 400 nm is preferably used. The amount of the iron oxide powder is from 35 to 83% by weight based on the total weight of the inorganic powders contained in the lower non-magnetic layer.

When the particle size of the iron oxide powder is less than 50 nm, it is difficult to uniformly disperse the powder. When the particle size of the iron oxide powder exceeds 400 nm, the unevenness at the interface between the lower non-magnetic layer and a layer formed thereon increases. When the amount of the iron oxide powder is less than 35% by weight, the strength of the layer may not be sufficiently increased. When the amount of the iron oxide powder exceeds 83% by weight, the strength of the layer tends to decrease.

Furthermore, the lower non-magnetic layer preferably contains alumina. The amount of alumina is preferably from 2 to 30% by weight, more preferably from 8 to 20% by weight, particularly preferably from 11 to 20% by weight, based on the total weight of the non-magnetic powders in the non-magnetic layer. When the amount of alumina is less than 2% by weight, the flowability of a coating paint of the lower non-magnetic layer may be insufficient. When the amount of alumina exceeds 30% by weight, the unevenness at the interface between the lower non-magnetic layer and a layer formed thereon increases.

The particle size of alumina to be added is preferably 100 nm or less, more preferably from 10 to 100 nm, particularly preferably from 30 to 90 nm, most preferably from 50 to 90 nm. When the particle size of alumina exceeds 100 nm, the surface smoothness of the lower non-magnetic layer may not be sufficiently improved, when a non-magnetic support has low surface smoothness, for example, a surface roughness of 2.5 nm or more, on the surface on which the magnetic layer is formed, and the lower non-magnetic layer has a thickness of 1.5 µm or less.

Alumina to be contained in the lower non-magnetic layer is preferably alumina comprising mainly the corundum phase (having a degree of alphatization of at least 30%). When the alumina comprising the corundum phase is used, the Young's modulus of the lower non-magnetic layer can be increased with a smaller amount of alumina than when σ-, θ- or γ-alumina is used, and thus the strength of the magnetic tape increases. Accordingly, the fluctuation of output caused by the edge weave of the tape edge can be suppressed.

Besides the alumina described above, α-alumina having a particle size of 100 to 800 nm may be used in an amount of less than 3% by weight based on the total weight of the non-magnetic powders in the non-magnetic layer.

The lower non-magnetic layer may contain conventional carbon black (CB) to improve the conductivity. As this carbon black, acetylene black, furnace black, thermal black, etc. may be used. Carbon black having a particle size of 5 to 200 nm is generally used, and carbon black having a particle size of 10 to 100 nm is preferably used. When the particle size of carbon black is less than 5 nm, the dispersion of the carbon black particles is difficult, since the carbon black has a structure. When the particle size of carbon black exceeds 200 nm, the surface smoothness of the non-magnetic layer may deteriorate.

The amount of carbon black is preferably from 15 to 40% by weight based on the total weight of the non-magnetic powders in the non-magnetic layer. When the amount of carbon black is less than 15% by weight, the effect of carbon black for increasing the conductivity is insufficient. When the amount of carbon black exceeds 40% by weight, the effect of the addition of carbon black saturates.

Preferably, carbon black having a particle size of 15 to 80 nm is used in an amount of 15 to 35% by weight. More preferably, carbon black having a particle size of 20 to 50 nm is used in an amount of 20 to 30% by weight. When the carbon black having the above particle size is used in the above amount, the electrical resistance is decreased so that the generation of electrostatic noise or the running irregularity of the magnetic tape are decreased.

Magnetic Layer:

The ferromagnetic powder contained in the upper magnetic layer is preferably a ferromagnetic iron-based metal powder. The ferromagnetic powder preferably has a coercive force of 135 to 280 kA/m (1700 to 3500 Oe), and a saturation magnetization of 100 to 200 $A \cdot m^2/kg$ (100 to 200 emu/g), more preferably 120 to 180 $A \cdot m^2/kg$ (120 to 180 emu/g).

Herein, the magnetic characteristics of the magnetic layer and the ferromagnetic powder are measured with a sample-vibration type fluxmeter in an external magnetic field of 1.28 MA/m (16 kOe).

The ferromagnetic powder preferably has an average major axis length of 10 to 150 nm, more preferably 20 to 60 nm. When the average major axis length of the ferromagnetic powder exceeds 150 nm, the particle noise depending on the particle size becomes larger and thus it is difficult to improve the C/N characteristics. When the average major axis length of the ferromagnetic powder is less than 10 nm, the coercive force of the magnetic powder decreases, and further the agglomeration force of the magnetic powder increases so that the dispersion of the magnetic powder in the coating composition becomes difficult.

The above average major axis length is determined by actually measuring the particle sizes on a photograph taken with a scanning electron microscope (SEM) and averaging the measured values of 100 particles.

The BET specific surface area of the ferromagnetic iron metal powder is preferably from 35 to 85 $m^2/g$, more preferably from 40 to 80 $m^2/g$, most preferably from 50 to 70 $m^2/g$.

The upper magnetic layer may contain a non-magnetic inorganic powder which functions as an abrasive. Examples of such a non-magnetic inorganic powder include α-alumina and β-alumina, which have a number average particle size (hereinafter simply referred to as "particle size") of 50 to 130 nm, a particle size distribution of 10 nm or less in terms of standard deviation, and Mohs hardness of at least 6. These alumina powders may be used singly or as a mixture thereof. Among them, alumina comprising the corundum phase (having a degree of alphatization of at least 30%) is particularly preferred. Such corundum type alumina has higher hardness than σ-, θ- or γ-alumina and thus it has a good head-cleaning effect in a smaller amount than σ-, θ- or γ-alumina. Furthermore, alumina prepared by a chemical vapor deposition (CVD) method is preferable since it has a narrow particle size distribution and is less sintered. The average particle size of the alumina abrasive is preferably from 50 to 130 nm, more preferably from 50 to 90 nm.

When the abrasive alumina having a particle size exceeding 130 nm is present in the magnetic layer, the head is excessively abraded. When the average particle size of the abrasive alumina is less than 50 nm, the durability and cleaning properties of the magnetic layer deteriorate.

When the particle size distribution of the abrasive alumina exceeds 10 nm, a part of the magnetic layer containing alumina particles with a large particle size excessively abrades the head, while a part of the magnetic layer containing alumina particles with a small particle size has decreased durability and cleaning properties. When the head is partly abraded, the properties of the head vary from part to part, and finally the head cannot perform satisfactorily.

The amount of the alumina abrasive is preferably from 5 to 20 parts by weight, more preferably from 8 to 18 parts by weight, based on 100 parts by weight of the ferromagnetic powder. When the amount of the alumina abrasive is less than 5 parts by weight, the film strength of the magnetic layer decreases and thus the durability of the magnetic layer deteriorates. In addition, the head-cleaning property of the magnetic layer significantly decreases, so that the debris adhered to the head may not be scraped off. When the amount of the alumina abrasive exceeds 20 parts by weight, the C/N characteristics may deteriorate.

The upper magnetic layer of the magnetic recording medium of the present invention may contain conventional carbon black (CB) to improve the conductivity and the surface lubricity. As such carbon black, acetylene black, furnace black, thermal black, etc. may be used. Carbon black having a particle size of 5 to 200 nm is generally used, and carbon black having a particle size of 10 to 100 nm is preferably used. When the particle size of carbon black is less than 10 nm, the dispersion of the carbon black particles is difficult. When the particle size of carbon black exceeds 200 nm, a large amount of carbon black should be added. In either case, the surface of the magnetic layer becomes rough and thus the output tends to decrease.

The amount of carbon black is preferably from 0.2 to 5 parts by weight, more preferably from 0.5 to 4 parts by weight, per 100 parts by weight of the ferromagnetic powder. When the amount of carbon black is less than 0.2 parts by weight, the effect of carbon black is insufficient. When the amount of carbon black exceeds 5 parts by weight, the surface of the magnetic layer becomes rough.

Lubricants:

The lower non-magnetic layer and the upper magnetic layer may contain lubricants having different functions. Preferably, the lower non-magnetic layer contains 0.5 to 4.0% by weight of a higher fatty acid and 0.2 to 3.0% by weight of a higher fatty acid ester based on the weight of the entire inorganic powder components, since the coefficient of dynamic friction of the magnetic tape against a head island can be decreased. When the amount of the higher fatty acid is less than 0.5% by weight, the effect to decrease the coefficient of friction is insufficient. When the amount of the higher fatty acid exceeds 4.0% by weight, the lower non-magnetic layer may be plasticized and thus the toughness of the lower non-magnetic layer may be lost. When the amount of the higher fatty acid ester is less than 0.2% by weight, the effect to decrease the coefficient of friction is insufficient. When the amount of the higher fatty acid ester exceeds 3.0% by weight, the amount of the higher fatty acid ester which migrates to the magnetic layer becomes too large, so that the magnetic tape may stick to rotating cylinders and/or a head island.

The coefficient of friction of the magnetic tape against a rotating cylinder can be decreased, when the magnetic layer contains 0.5 to 3.0% by weight of a fatty acid amide and 0.2 to 3.0% by weight of a higher fatty acid ester based on the weight of the ferromagnetic powder. When the amount of the fatty acid amide is less than 0.2% by weight, the head tends to directly contact the magnetic layer, and thus, the burning-preventive effect is poor. When the amount of the fatty acid amide exceeds 3.0% by weight, the fatty acid amide may bleed out and cause some defect such as dropout. As the fatty acid amide, fatty acid amides each having at least 10 carbon atoms such as the amides of palmitic acid, stearic acid and the like can be used.

The addition of less than 0.2% by weight of a higher fatty acid ester is insufficient to decrease the coefficient of friction, while the addition of 3.0% by weight or more of a higher fatty acid ester gives an adverse influence such as sticking of the magnetic tape to the heads. The intermigration of the lubricants of the upper magnetic layer and the lower non-magnetic layer between both the layers may be allowed.

Binders:

As binders to be contained in the lower non-magnetic layer and the upper magnetic layer, the following can be used in combination with a polyurethane resin: that is, at least one resin selected from a vinyl chloride resin, a vinyl chloride-vinyl acetate copolymer, a vinyl chloride-vinyl alcohol copolymer, a vinyl chloride-vinyl acetate-vinyl alcohol copolymer, a vinyl chloride-vinyl acetate-maleic anhydride copolymer, a vinyl chloride-hydroxyl group-containing alkyl acrylate copolymer, nitrocellulose (cellulose resins), and the like. Among them, the combination of a vinyl chloride-hydroxyl group-containing alkyl acrylate copolymer resin and a polyurethane resin is preferably used. Examples of the polyurethane resin include polyesterpolyurethane, polyetherpolyurethane, polyetherpolyesterpolyurethane, polycarbonatepolyurethane, polyestrepolycarbonatepolyurethane, etc.

It is preferable to use a binder resin having a functional group such as —COOH, —SO$_3$M, —OSO$_3$M, —P=O(OM)$_3$, —O—P=O(OM)$_2$ wherein M is a hydrogen atom, an alkali metal base or an amine salt; —OH, —NR$^1$R$^2$, —N$^+$R$^3$R$^4$R$^5$ wherein R$^1$, R$^2$, R$^3$, R$^4$ and R$^5$ are the same or different, each independently a hydrogen atom or a hydrocarbon group; or an epoxy group. The reason why such a binder is used is that the dispersibility of the magnetic powder, etc. is improved. When two or more resins are used in combination, it is preferable that the polarities of the functional groups of the resins are the same. In particular, the combination of resins both having —SO$_3$M groups is preferable.

The binder is used in an amount of 7 to 50 parts by weight, preferably from 10 to 35 parts by weight, based on 100 parts by weight of the ferromagnetic powder in the upper magnetic layer, or based on total 100 parts by weight of all the non-magnetic powders in the lower non-magnetic layer. In particular, the preferable combination as the binder for the lower non-magnetic layer and/or the upper magnetic layer is 5 to 30 parts by weight of a vinyl chloride-based resin and 2 to 20 parts by weight of a polyurethane resin.

It is preferable to use the binder in combination with a thermally curable crosslinking agent which bonds with the functional groups in the binder to crosslink the same. Preferable examples of the crosslinking agent include isocyanates such as tolylene diisocyanate, hexamethylene diisocyanate and isophorone diisocyanate; and polyisocyanates such as the reaction products of these isocyanates with compounds each having a plurality of hydroxyl groups such as trimethylolpropane, and the condensation products of these isocyanates; and the like. The crosslinking agent is used in an amount of usually 10 to 50 parts by weight, preferably 15 to 35 parts by weight, based on 100 parts by weight of the binder.

Organic Solvents:

Examples of organic solvents used in the formation of the upper magnetic layer and/or the lower non-magnetic layer include ketones (e.g. acetone, methyl ethyl ketone, methyl isobutyl ketone, diisobutyl ketone, cyclohexanone, isophorone, tetrahydrofuran, etc.), alcohols (e.g. methanol, ethanol, propanol, butanol, isobutyl alcohol, isopropyl alcohol, methylcyclohexanol, etc.), esters (e.g. methyl acetate, butyl acetate, isobutyl acetate, isopropyl acetate, ethyl lactate, glycol acetate, etc.), glycol ethers (e.g. glycol dimethyl ether, glycol monoethyl ether, dioxane, etc.), aromatic hydrocarbons (e.g. benzene, toluene, xylene, cresol, chlorobenzene, etc.), chlorohydrocarbons (e.g. methylene chloride, ethylene chloride, carbon tetrachloride, chloroform, ethylene chlorohydrin, dichlorobenzene, etc.), N,N-dimethylformamide, hexane, and the like. These solvents may be used independently or as a mixture thereof.

Backcoat Layer:

The backcoat layer formed on the back surface of the non-magnetic support may be a conventional backcoat layer. The thickness of the backcoat layer is preferably from 0.2 to 0.8 μm. When the thickness of the backcoat layer is less than 0.2 μm, the effect to improve the tape-running performance is insufficient. When the thickness of the backcoat layer exceeds 0.8 μm, the total thickness of the magnetic tape increases, so that the recording capacity per reel of the tape decreases.

The backcoat layer may be formed by any conventional coating method, for example, gravure coating, roll coating, blade coating, die coating, etc.

The backcoat layer preferably contains carbon black to improve the tape running performance. As carbon black to be contained in the backcoat layer, acetylene black, furnace black, thermal black or the like can be used. In general, carbon black with a small particle size and carbon black with a large particle size are used in combination. The particle size of small particle size carbon black is usually from 5 to 200 nm, preferably from 10 to 100 nm. When the particle size of the small particle size carbon black is less than 10 nm, the dispersion thereof is difficult. When the particle size of the small particle size carbon black exceeds 200 nm, a large amount of carbon black is necessary. In either case, the surface of the backcoat layer becomes rough and thus the surface roughness of the backcoat layer may be transferred to the magnetic layer (embossing). When the large particle size black carbon having a particle size of 300 to 400 nm is used in an amount of 5 to 15% by weight based on the weight of the small particle size carbon black, the surface of the backcoat layer is not roughened and the effect to improve the tape-running performance is enhanced. The total amount of the small particle size carbon black and the large particle size carbon black is preferably from 60 to 98% by weight, more preferably from 70 to 95% by weight, based on the total weight of the inorganic powders in the backcoat layer.

The center line average surface roughness Ra of the backcoat layer is preferably from 3 to 8 nm, more preferably from 4 to 7 nm.

To increase the strength of the backcoat layer, preferably iron oxide particles with a particle size of preferably 100 to 600 nm, more preferably 200 to 500 nm, is added to the backcoat layer. The amount of the iron oxide particles is preferably from 2 to 40% by weight, more preferably from 5 to 30% by weight, based on the total weight of the inorganic powders in the backcoat layer.

Magnetic Recording Medium:

The magnetic paint may be prepared by the following method:

A magnetic powder and a small amount of a binder are mixed and kneaded using a high-power kneading machine such as a kneader, a continuous twin-screw extruder. To the mixture, a solvent is added and mixed at a solid content of 35 to 45% by weight to obtain a past-form mill base. When the twin-screw extruder is used, its barrel is equipped with a heating/cooling means to control a barrel temperature in a range of 20 to 50° C., preferably 25 to 35° C. When the barrel temperature is lower than 20° C., the wetting property of the mixture to be kneaded may not be improved so that the dispersibility of the components is not increased. When the barrel temperature exceeds 50° C., the viscosity of the mixture decreases so that a desired shear force is not exerted on the mixture. A kneading time is preferably from 2 to 5 minutes, and a supply rate of the mixture is from 5 to 15 kg/hr. Then, the kneaded mixture is dispersed in a sand mill and the like to improve the dispersion of the solid components in the mixture.

The average dry thickness of the upper magnetic layer is preferably from 1 to 200 nm, more preferably from 10 to 90 nm.

When the magnetic paint is applied on the lower non-magnetic layer which is still in a wet state, that is, by a wet-on-wet method, the magnetic layer can be precisely formed at any thickness in the above range at a high productivity. In this case, the magnetic paint for the magnetic layer and the non-magnetic paint for the non-magnetic layer are substantially simultaneously applied on the non-magnetic support using a die coating head having two slits. To improve the stability of the coating process, preferably the surface tension of the solvent contained in the non-magnetic paint is larger than that of the solvent contained in the magnetic paint. Examples of solvents having a relatively high surface tension include cyclohexanone, dioxane, etc.

After the non-magnetic layer and the magnetic layer are formed, they are calendered with metal rolls to enhance the effects of the present invention. Besides the metal rolls, heat-resistant plastic rolls, for example, rolls made of an epoxy resin, a polyimide resin, a polyamide resin, a polyimideamide resin, etc. may be used.

The calendering temperature is preferably at least 70° C., more preferably at least 80° C. A linear pressure in the calendering step is at least 200×9.8 N/cm, preferably at least 300×9.8 N/cm, and a calendering rate is from 20 to 700 m/min. The effects of the present invention can be effectively achieved at a calendering temperature of at least 80° C. and a linear pressure of at least 300×9.8 N/cm.

The backcoat layer may be formed before, during or after the formation and/or calendering of the non-magnetic layer and the magnetic layer. To accelerate the curing of the backcoat layer, the coated backcoat layer may be aged at a temperature of 40 to 80° C.

The average dry thickness of the upper magnetic layer is usually from 1 to 200 nm, preferably from 10 to 90 nm. When the thickness of the upper magnetic layer is less than 1 nm, the leakage of a magnetic field from the magnetic layer is small so that a head output decreases. When the thickness of the upper magnetic layer exceeds 200 nm, the head output decreases due to the thickness loss.

In the magnetic recording medium, the upper magnetic layer has a coercive force of 135 to 280 kA/m (1700 to 3500 Oe), preferably 160 to 240 kA/m (2000 to 3000 Oe) in the head running direction, and a residual magnetic flux density of at least 0.35 T (3500 G), preferably 0.4 to 0.5 T (4000 to 5000 G).

When the coercive force is less than 135 kA/m, the output is decreased by a diamagnetic field. When the coercive force exceeds 280 kA/m, the writing with a head may be difficult. When the residual magnetic flux density is less than 0.35 T, the output may decrease.

When the magnetic recording medium of the present invention is supplied to a system which uses a MR head as a reproducing head, a Mrt value, which is a product of a residual magnetization in the machine direction of a magnetic layer or a residual magnetic flux density and the thickness of a magnetic layer, is preferably 72 Tnm (6.0 memu/cm$^2$) or less, more preferably from 2 to 24 Tnm (0.2 to 2.00 memu/cm$^2$) and a squareness ratio is preferably at least 0.85, more preferably from 0.90 to 0.97. When the Mrt value exceeds 72 Tnm, almost all the MR heads may be saturated. When the squareness ratio is less than 0.85, recording demagnetization may be caused by thermal disturbance.

The thickness of the lower non-magnetic layer is usually from 0.5 to 3 μm, preferably from 1 to 2 μm. When the thickness of the lower non-magnetic layer is less than 0.5 μm, it is difficult to coat the non-magnetic paint on the non-magnetic support and therefore, the productivity decreases. When the thickness of the lower non-magnetic layer exceeds 3 μm, the total thickness of the magnetic tape increases so that the recording capacity per reel decreases.

To improve the adhesion of the lower non-magnetic layer to the non-magnetic support, a conventional primer layer may be formed between them. The thickness of the primer layer is preferably from 0.01 to 2 μm, more preferably from 0.05 to 0.5 μm.

The Young's modulus of the laminated coating layer comprising the lower non-magnetic layer and the upper magnetic layer is preferably from 40 to 100%, more preferably 50 to 100%, particularly preferably 60 to 90% of the average value of the Young's moduli of the non-magnetic support in the machine and transverse directions. When the Young's modulus of the laminated coating layer is less than the above lower limit, the durability of the coating layer may decrease. When the Young's modulus of the laminated coating layer exceeds the above upper limit, the touch between the magnetic tape and the head is worsened.

According to the present invention, the Young's modulus of the laminated coating layer can be controlled, for example, by adjusting the calendering conditions.

The Young's modulus of the lower non-magnetic layer is preferably from 80 to 99% of the Young's modulus of the upper magnetic layer. When the Young's modulus of the lower non-magnetic layer is smaller than that of the upper magnetic layer, the lower non-magnetic layer functions as a cushion in the calendering process.

The coefficient of dynamic friction of the magnetic layer of the magnetic tape against SUS is preferably 0.5 or less, more preferably 0.3 or less. Also, the coefficient of dynamic friction of the backcoat layer of the magnetic tape against SUS is preferably 0.5 or less, more preferably 0.3 or less.

In the magnetic recording medium according to the present invention, the surface resistivity of the laminated coating layer of is preferably from $10^4$ to $10^{11}$ Ω/square, and the surface resistivity of the backcoat layer is preferably from $10^3$ to $10^9$ Ω/square.

When a cartridge tape is assembled using the magnetic tape according to the present invention, it has a large capacity per reel and high reliability. Thus, it can be advantageously used as a backup tape.

EXAMPLES

The present invention will be explained in detail by the following Examples, which do not limit the scope of the invention in any way. In Examples and Comparative Examples, "parts" are "parts by weight", unless otherwise specified.

Example 1

| Components of Coating Composition for Magnetic Layer | |
| --- | --- |
| (1) | |
| Ferromagnetic iron-based metal powder<br>[Co/Fe: 30 atomic %, Y/(Fe + Co): 8 atomic %,<br>Al/(Fe + Co): 56% by weight, σs: 125 A · m²/kg,<br>Hc: 188 kA/m, pH: 9.5, and<br>average major axis length: 60 nm] | 100 parts |
| Vinyl chloride-hydroxypropyl acrylate copolymer<br>(—SO$_3$Na group content: 0.7 × 10$^{-4}$ eq./g) | 10 parts |
| Polyester-poyurethane resin<br>(—SO$_3$Na group content: 1.0 × 10$^{-4}$ eq./g) | 4 parts |
| α-Alumina<br>(CVD process; corrundum;<br>median particle size: 100 nm) | 15 parts |
| Carbon black<br>(average particle size: 75 nm;<br>DBP oil absorption: 72 cc/100 g) | 2 parts |
| Methyl acid phosphate | 2 parts |
| Palmitic acid amide | 1.5 parts |
| n-Butyl stearate | 1.0 part |
| Tetrahydrofuran | 65 parts |
| Methyl ethyl ketone | 245 parts |
| Toluene | 85 parts |
| (2) | |
| Polyisocyanate | 4 parts |
| Cyclohexanone | 167 parts |

| Components of Coating Composition for Lower Non-Magnetic Layer | |
| --- | --- |
| (1) | |
| Iron oxide powder | 68 parts |
| Alumina<br>(degree of aiphatization: 50%;<br>average particle size: 70 nm)) | 8 parts |
| Carbon black<br>(average particle size: 25 nm) | 24 parts |
| Stearic acid | 2 parts |
| Vinyl chloride copolymer<br>(—SO$_3$Na group content: 0.7 × 10$^{-4}$ eq./g) | 10 parts |
| Polyesterpolyurethane resin<br>(Tg: 40° C.; —SO$_3$Na group content: 1 × 10$^{-4}$ eq./g) | 4.5 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate | 4.5 parts |
| Cyclohexanone | 10 parts |
| Methyl ethyl ketone | 15 parts |
| Toluene | 10 parts |

A coating composition for a magnetic layer was prepared by kneading the components of Group (1) with a kneader and dispersed with a sand mill using zirconia beads having a bead diameter of 0.5 mm for a residence time of 45 minutes. To the mixture, the components of Group (2) were added and stirred, and then the mixture was filtrated to obtain a coating composition for a magnetic layer.

Separately, a coating composition for a lower non-magnetic layer was prepared by kneading the components of Group (1) with a kneader. Then, to the mixture the components of Group (2) were added and dispersed with a sand mill for a residence time of 60 minutes, and further the components of Group (3) were added and stirred followed by filtration to obtain a coating composition for a lower non-magnetic layer.

The coating composition for a lower non-magnetic layer was coated on a non-magnetic support made of a polyethylene terephthalate film (manufactured by Toray; thickness: 6 μm; Young's modulus in the machine direction (MD)=5.9 GPa; Young's modulus in the transverse direction (TD)=3.9 GPa) so that the primer layer could have a thickness of 1.1 μm after drying and calendering, and then calendered. On the formed lower non-magnetic layer, the coating composition for a magnetic layer was coated by a wet-on-wet method so that the magnetic layer could have a thickness of 40 nm after orientation in a magnetic field, drying and calendering. After the orientation in the magnetic field, the magnetic layer was dried with a drier to obtain a magnetic sheet.

The orientation in the magnetic field was carried out by arranging N—N opposed magnets (0.5 T) in front of the drier, and arranging, in the drier, two pairs of N—N opposed magnets (0.5 T) at an interval of 50 cm and at a position 75 cm before a position where the dryness of the layer was felt by one's fingers. The coating rate was 100 m/min.

| Components of Coating Composition for Backcoat Layer | |
| --- | --- |
| Carbon black (average particle size: 25 nm) | 80 parts |
| Carbon black (average particle size: 370 nm) | 10 parts |
| Iron oxide particles<br>(average particle size: 4000 nm) | 10 parts |
| Nitrocellulose | 45 parts |
| Polyurethane resin (containing —SO$_3$Na group) | 30 parts |
| Cyclohexanone | 260 parts |
| Toluene | 260 parts |
| Methyl ethyl ketone | 525 parts |

The components of a coating composition for a backcoat layer were dispersed with a sand mill for a residence time of 45 minutes and a polyisocyanate (15 parts) as a crosslinking agent was added to the mixture to obtain a coating composition for a backcoat layer. After filtration, the coating composition was coated on the other surface of the magnetic sheet having the magnetic layer formed on its one surface, so that the resultant backcoat layer could have a thickness of 0.5 μm after dried and calendered, and then, the backcoat layer was dried to obtain the magnetic sheet coated with the backcoat layer.

The magnetic sheet obtained was planished with a seven-stage calender comprising metal rolls at a temperature of 100° C. under a linear pressure of 150×9.8 N/cm, and wound onto a core and aged at 70° C. for 72 hours. After that, the magnetic sheet was slit into strips with a width of ½ inch.

A tape obtained by slitting the magnetic sheet was fed at a rate of 200 m/min. while the surface of the magnetic layer thereof was being polished with a lapping tape and a blade, and wiped to finish a magnetic tape. In this regard, K10000 was used as the lapping tape; a carbide blade was used as the blade; and Toraysee (trade name) manufactured by Toray was used to wipe the surface of the magnetic layer.

The resultant tape was installed in a cartridge to obtain a magnetic tape for computers.

Example 2

A magnetic tape for computers was produced in the same manner as in Example 1 except that plate form ceria (cerium oxide) powder was used as a non-magnetic inorganic powder contained in an upper magnetic layer.

Example 3

A magnetic tape for computers was produced in the same manner as in Example 1 except that plate-form iron oxide powder was used as a non-magnetic inorganic powder contained in an upper magnetic layer.

Example 4

A magnetic tape for computers was produced in the same manner as in Example 1 except that plate-form zirconia (zirconium oxide) powder was used as a non-magnetic inorganic powder contained in an upper magnetic layer.

Comparative Example 1

A magnetic tape for computers was produced in the same manner as in Example 1 except that an alumina powder having a median particle size of 100 nm (HIT 100 manufactured by Sumitomo Chemical Co., Ltd.) was used as a non-magnetic inorganic powder contained in an upper magnetic layer.

Comparative Example 2

A magnetic tape for computers was produced in the same manner as in Example 1 except that an alumina powder having a median particle size of 250 nm (AKP-28 manufactured by Sumitomo Chemical Co., Ltd.) was used as a non-magnetic inorganic powder contained in an upper magnetic layer.

Comparative Example 3

A magnetic tape for computers was produced in the same manner as in Example 1 except that an alumina powder having a median particle size of 170 nm (AKP-48 manufactured by Sumitomo Chemical Co., Ltd.) was used as a non-magnetic inorganic powder contained in an upper magnetic layer.

Comparative Example 4

A magnetic tape for computers was produced in the same manner as in Example 1 except that a small particle size alumina powder having a median particle size of 200 nm was used as a non-magnetic inorganic powder contained in an upper magnetic layer.

Evaluations:

The magnetic tapes produced in the Examples and Comparative Examples were evaluated by the following methods:

To measure the maximum and minimum particle sizes of the non-magnetic inorganic powder contained in the upper magnetic layer, the surface of the upper magnetic layer of the magnetic tape was observed with a scanning electron microscope at a magnification of 50,000 times, and a microphotograph was taken. Then, the microphotograph was subject to image processing, and the major axis length, minor axis length, particle size and acicular ratio of the inorganic powder particles were determined as follows:

In the two-dimensional image of the particles obtained by the image processing, the longest length among the particle sizes was used as a major axis length. The shortest particle size among the line segments, which intersected with the center point of the major axis was used as a minor axis length. Then, the average of the major and minor axis lengths was used as a particle size, and a ratio of the major axis length to the minor axis length was used as an acicular ratio.

Furthermore, the maximum particle size, the minimum particle size and the maximum acicular ratio were determined as follows:

In a field of view having a size of 1.8 μm×2.4 μm of the above microphotograph, the statistical distributions of the particle size and the acicular ratio were obtained. The reason why the field of view having a size of 1.8 μm×2.4 μm was used is that it had been confirmed that the statistical distributions in the filed of view having such a size are substantially the same as those in the entire magnetic layer.

The maximum particle size Dx, the minimum particle size Di and the maximum acicular ratio Rx are defined as follows:

$$Dx = D + 2\sigma d$$

$$Di = D - 2\sigma d$$

$$Rx = R + 2\sigma r$$

wherein D (nm) and σd (nm) are a statistical average and a standard deviation of the particle sizes, respectively, and R (nm) and σr (nm) are a statistical average and a standard deviation of the acicular ratios, respectively, which are all derived from the statistical distributions.

The amount of abrasion of a head was evaluated as follows:

When a pointed edge of a square column made of ferrite is reciprocally slid on the magnetic layer of a magnetic tape, the edge is abraded and has a narrow plane with a certain width. This width is used as a measure of an abraded amount. This abraded amount is correlated with the abraded amount of a MR head. When the width of the abraded edge plane of the square column is 10 μm or less, the magnetic tape has no problem in practical use.

A square column was a rectangular parallelepiped having a size of 3 mm×3 mm×15 mm, and loaded on a ½ inch-2 reel tester using a special jig. The tape was wound on the longer side of the square column at a winding angle of 75 degrees, while an angle between the tape and the square column was 15 degrees on each of the entrance and exit sides. The measuring conditions with the 2 reel tester included a running speed of 2.54 m/sec. and a running tension of 1 N. The tape was reciprocally slid against the edge of the square column over a tape length of 180 m. The measuring condition was 23° C. and 50% RH. After running of the tape, the square rod was placed with the abraded edge facing upward so that the plane of the abraded edge was horizontally positioned. Then, the plane was observed with an optical microscope with illuminating the plane of the abraded edge form the above, and the width of the plane was measured.

The durability of the magnetic tape was evaluated as follows:

When a magnetic tape is run under high temperature-low humidity condition, an output decreases in comparison with the initial output. The degree of this decrease of the output is calculated by the following formula:

Degree of output decrease (%)=100×[(output after running)−(initial output)]/(initial output)

This value was used as a measure of durability. When the degree of output decrease is 10% or less, the durability is satisfactory.

The reason why the high temperature-low humidity condition was selected is that, under this condition, the abrasion ability of the non-magnetic inorganic powder in the magnetic layer is easily exerted.

The measurement was carried out with a ½ inch-2 reel tester by recording and reproducing a magnetic tape with attaching a thin-film type inductive head to the tester.

In the actual measurement, a sine wave having a wavelength of 2 μm was recorded over 530 m of the magnetic tape, and this recorded length of the magnetic tape was reciprocally run 16 times while reproducing the signals. After the sixteenth run, the degree of output decrease was calculated, and used as a measure of durability. The measuring conditions included a temperature of 40° C., a relative humidity of 5% RH, a running speed of 2.54 m/sec. and a tension of 1 N.

The results of the above evaluations are shown in Table 1.

TABLE 1

| | 1 | 2 | 3 | 4 |
|---|---|---|---|---|
| | Example No. | | | |
| Inorganic powder | Corundum alumina | Plate-form ceria | Plate-form iron oxide | Plate-form zirconia |
| Maximum particle size of inorganic powder (μm) | 0.13 | 0.11 | 0.12 | 0.13 |
| Minimum particle size of inorganic powder (μm) | 0.05 | 0.03 | 0.05 | 0.05 |
| Maximum acicular ratio of inorganic powder | 1.2 | 1.1 | 1.2 | 1.4 |

TABLE 1-continued

| | 1 | 2 | 3 | 4 |
|---|---|---|---|---|
| Abraded amount (μm) | 6 | 5 | 5 | 9 |
| Durability | −10% | −10% | −10% | −8% |
| | Comparative Example No. | | | |
| Inorganic powder | HIT 100 | AKP-28 | AKP-48 | Small particle size alumina |
| Maximum particle size of inorganic powder (μm) | 0.20 | 0.80 | 0.40 | 0.20 |
| Maximum particle size of inorganic powder (μm) | 0.04 | 0.2 | 0.1 | 0.03 |
| Acicular ratio of inorganic powder | 2.1 | 2.2 | 1.8 | 2.1 |
| Abraded amount (μm) | 9 | 16 | 14 | 5 |
| Durability | −25% | −5% | −5% | −20% |

As can be seen from the results in Table 1, the magnetic tapes for computers of Examples according to the present invention had lower abrading properties and higher durability than those of Comparative Examples.

What is claimed is:

1. A magnetic recording medium comprising a non-magnetic support, a non-magnetic layer and a magnetic layer having a thickness of 1 nm to 200 nm,
   wherein the non-magnetic layer comprises a binder and a thermally curable crosslinking agent,
   wherein the magnetic layer forms outermost layer of the magnetic recording medium and comprises a ferromagnetic powder and a binder, and
   wherein at least 95% of the non-magnetic inorganic powder particles including primary and secondary particles, which are contained in the magnetic layer, have an acicular ratio of 1.5 or less and a particle size of 0.05 to 0.13 μm, provided that the non-magnetic inorganic powder particles are those found in a field of view of 1.8 μm×2.4 μm when the surface of the magnetic layer is observed with a scanning electron microscope at a magnification of 50,000 times.

2. The magnetic recording medium according to claim 1, wherein said non-magnetic inorganic powder particles contained in the magnetic layer are single crystal alumina.

3. The magnetic recording medium according to claim 1, said non-magnetic layer comprising a non-magnetic inorganic powder, a binder and a fatty acid.

4. The magnetic recording medium according to claim 1, which is a magnetic tape for data-backup.

\* \* \* \* \*